United States Patent
Song et al.

(10) Patent No.: US 7,663,844 B2
(45) Date of Patent: Feb. 16, 2010

(54) ACTUATOR ARM WITH ARM HOLE TO IMPROVE DYNAMIC CHARACTERISTICS AND ACTUATOR ASSEMBLY HAVING THE SAME

(75) Inventors: Yong-han Song, Seoul (KR);
Kwang-kyu Kim, Suwon-si (KR);
Woo-sung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 561 days.

(21) Appl. No.: 11/505,414

(22) Filed: Aug. 17, 2006

(65) Prior Publication Data
US 2007/0047151 A1    Mar. 1, 2007

(30) Foreign Application Priority Data
Aug. 30, 2005    (KR) .................. 10-2005-0079955

(51) Int. Cl.
*G11B 21/02*    (2006.01)
*G11B 5/48*    (2006.01)
*G11B 21/21*    (2006.01)

(52) U.S. Cl. ..................... 360/266; 360/265.9
(58) Field of Classification Search ............. 360/244.5, 360/265.9, 266, 266.1, 265.7
See application file for complete search history.

(56) References Cited

U.S. PATENT DOCUMENTS

| | | | |
|---|---|---|---|
| 5,268,805 A * | 12/1993 | Peng et al. ........... | 360/266 |
| 6,757,136 B2 * | 6/2004 | Buske et al. ........... | 360/244.5 |
| 2003/0081356 A1 * | 5/2003 | Shimizu et al. ......... | 360/265.9 |
| 2003/0169537 A1 * | 9/2003 | Weichelt et al. ........ | 360/265.9 |
| 2003/0218833 A1 * | 11/2003 | Nagahiro et al. ....... | 360/265.9 |
| 2005/0180056 A1 * | 8/2005 | Shimizu et al. ......... | 360/265.9 |
| 2006/0092574 A1 * | 5/2006 | Oh et al. ................ | 360/265.9 |
| 2007/0002497 A1 * | 1/2007 | Shimizu et al. ......... | 360/265.9 |

FOREIGN PATENT DOCUMENTS

JP    2003-141826    5/2003

* cited by examiner

*Primary Examiner*—William J Klimowicz
(74) *Attorney, Agent, or Firm*—Stanzione & Kim LLP (57) ABSTRACT

An actuator assembly usable un a hard disk drive includes an actuator arm having an arm hole to improve dynamic characteristics. The actuator arm of the actuator assembly has an arm hole having first, second, and third extended portions, and two members positioned at both sides of the arm hole. The first extended portion is formed at an edge positioned at a leading end of the arm hole so that each of leading ends of the two members has a first reduced width, the second extended portions are formed at edges positioned at a rear end of the arm hole so that each of rear ends of the two members has a second reduced width, and the third extended portions are formed at both sides of a middle portion of the arm hole so that each of middle portions of the two members has a third reduced width. The third width is smaller than the second width and larger than the first width, so that a displacement of a read/write head in a major resonance mode is minimized, a bandwidth for position control of the read/write head is widened, and a position error signal is decreased when the hard disk drive operates.

8 Claims, 6 Drawing Sheets

ACTUATOR ARM WITH ARM HOLE TO IMPROVE DYNAMIC CHARACTERISTICS AND ACTUATOR ASSEMBLY HAVING THE SAME

CROSS-REFERENCE TO RELATED APPLICATIONS

This application claims priority of Korean Patent Application No. 10-2005-0079955, filed on Aug. 30, 2005, in the Korean Intellectual Property Office, the disclosure of which is incorporated herein in its entirety by reference.

BACKGROUND OF THE INVENTION

1. Field of the Invention

The present general inventive concept relates to a hard disk drive, and more particularly, to an actuator arm having an arm hole with an optimized shape to improve dynamic characteristics, and an actuator assembly having the same.

2. Description of the Related Art

A hard disk drive (HDD) is an information storage device of a computer that stores and reproduces data on a disc using a read/write head. The hard disk drive uses an actuator to move the read/write head to the desired position to read/write data.

Figure 1:
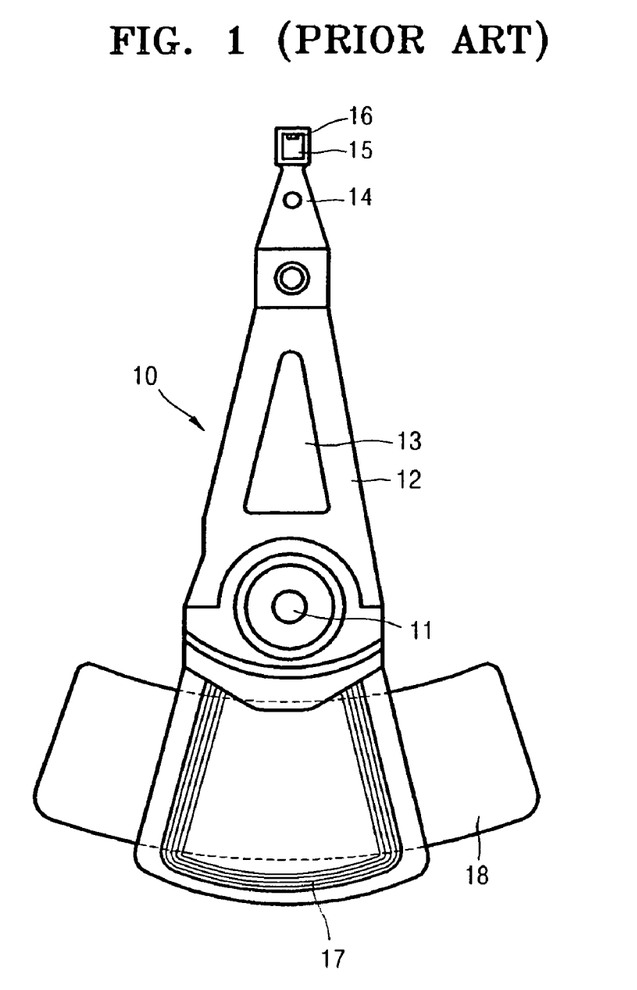
FIG. 1 is a plan view illustrating an actuator assembly of a conventional hard disk drive.

FIG. 1 is a plan view illustrating an actuator assembly 10 of a conventional hard disk drive.

Referring to FIG. 1, the actuator assembly 10 of the hard disk drive moves a read/write head 16 for recording and reproducing data to and from a certain position above a data storage disk (not shown). The actuator assembly 10 includes an actuator arm 12 rotatably coupled to a pivot shaft 11 installed on a base member (not shown) of the hard disk drive. The actuator arm 12 includes, at its leading end, a suspension 14 for supporting a slider 15 biasing the head 16 against the surface of the disk, and at its middle portion, a substantially triangular arm hole 13 for reducing a weight of the arm 12. A voice coil 17 is coupled to the rear end of the actuator arm 12. A magnet 18 is arranged opposite the voice coil 17. The voice coil 17 and the magnet 18 form a voice coil motor (VCM) for rotating the actuator arm 12.

The voice coil motor is controlled by a servo control system so that the actuator arm 12 is rotated according to Fleming's left-hand rule by an interaction between an input electric current of the voice coil 17 and a magnetic field of the magnet 18. When the hard disk drive is turned on and the disk starts to rotate, the VCM moves the actuator arm 12 to move the read/write head 16 to a position above a data recording surface of the disk. From there, the read/write head 16 traces a track on the data recording surface of the disk to record or reproduce data. When the hard disk drive is turned off and the disk stops rotating, the VCM moves the actuator arm 12 in an opposite direction to move the read/write head 16 away from the data recording surface of the disk.

Recently, tracks of the disk have become narrower as the recording density increases, so that it is necessary to increase precision for position control of the read/write head. A major resonance mode of the actuator arm has an effect on the precision of the position control of the read/write head. The major resonance mode of the actuator arm means a vibration mode of bending deformation of the actuator arm, and is also referred to as a butterfly mode. The major resonance mode of the actuator arm is caused by an operation of an actuator assembly. When a force is input to a voice coil to operate the actuator assembly, as an output, the read/write head is displaced. As displacement of the read/write head increases, a position error signal (PES) increases, deteriorating reliability of reproducing and recording data. Accordingly, in order to reduce the PES, it is necessary to minimize the displacement of the read/write head.

Figure 2:
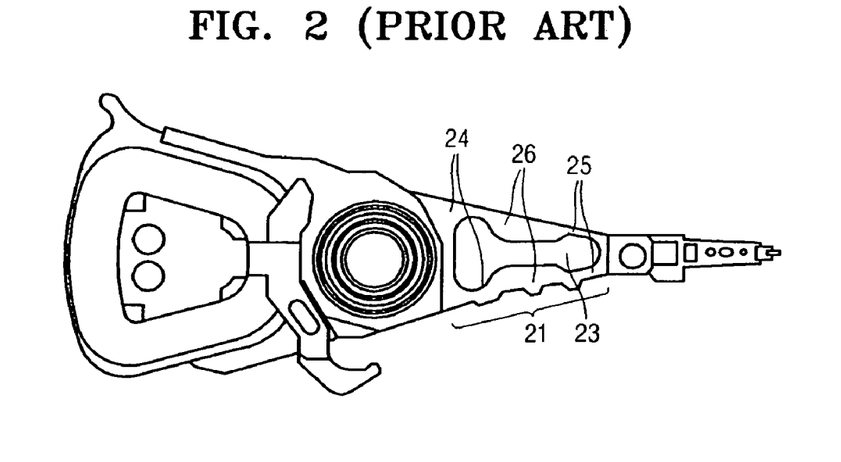
FIG. 2 is a plan view illustrating another actuator assembly of a conventional hard disk drive.

FIG. 2 illustrates an actuator assembly as disclosed in Japanese Patent Laid-Open No. 2003-141826.

Referring to FIG. 2, an actuator arm 21 has an arm hole 23 which gives the actuator arm 21 a bar linkage structure. That is, the actuator arm 21 has a shape defined by a leading portion 25, a rear portion 24, and a middle portion 26. When the leading portion 25, the rear portion 24, and the middle portion 26 define a shape of the arm hole 23, widths of the leading portion 25 and the rear portions are narrower than that of the middle portion 26. The lesser widths of the rear and leading portions 24 and 25 of the actuator arm 21 create a hinge of the bar linkage structure.

Figure 3:
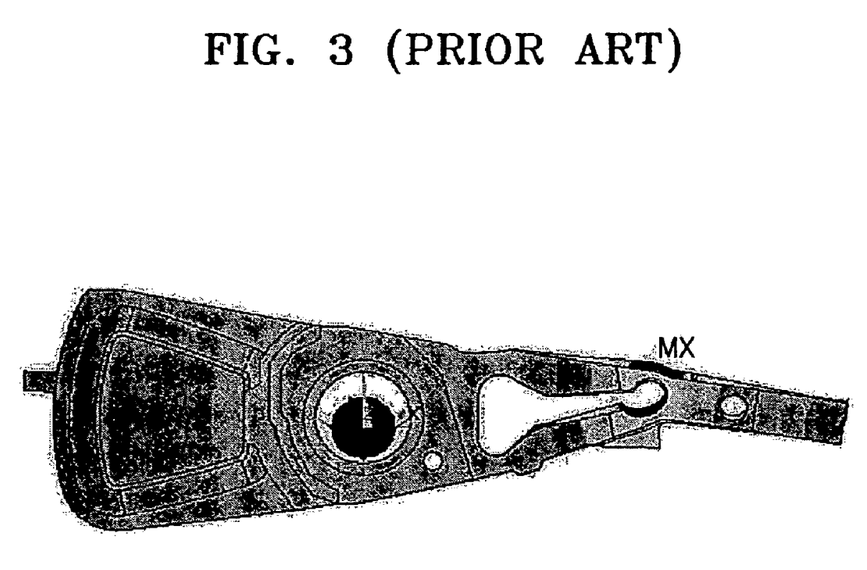
FIG. 3 shows displacement of a read/write head in a major resonance mode of a conventional actuator arm with a conventional bar linkage structure.

FIG. 3 shows displacement MX of a read/write head in a major resonance mode of a conventional actuator arm with a bar linkage structure.

Referring to FIG. 3, it can be understood that since the actuator arm has the bar linkage structure, the displacement of the read/write head in the major resonance mode can be minimized.

However, referring to FIG. 7 and Table 1 to be described later, the actuator arm has a drawback in decreasing a frequency of the major resonance mode although the actuator arm with the bar linkage structure has the advantage of increasing the gain margin. This is undesirable, even when the actuator arm require a narrow bandwidth for position control of the read/write head.

SUMMARY OF THE INVENTION

The present general inventive concept provides an actuator arm having an arm hole with a shape to improve dynamic characteristics, and an actuator assembly having the same.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing an actuator arm of a hard disk drive to move a read/write head, the actuator arm including an arm hole having first, second, and third extended portions, and two members positioned at both sides of the arm hole, wherein the first extended portion is formed at an edge positioned at a leading end of the arm hole so that each of leading ends of the two members has a first width, wherein the second extended portions are formed at edges positioned at a rear end of the arm hole so that each of rear ends of the two members has a second width, and wherein the third extended portions are formed at both sides of a middle portion of the arm hole so that each of middle portions of the two members has a third width.

The third extended portions may be formed such that the third width is smaller than the second width and larger than the first width.

The foregoing and/or other aspects and advantages of the present general inventive concept may also be achieved by providing an actuator assembly usable in a hard disk drive, the actuator including a slider to support a read/write head, a suspension to support the slider, an actuator arm rotatably coupled to a pivot shaft and having a leading end fixed to the suspension, and a voice coil motor to rotate the actuator arm, wherein the actuator arm has an arm hole having first, second, and third extended portions, and two members positioned at both sides of the arm hole, the first extended portion is formed at an edge positioned at a leading end of the arm hole so that each of leading ends of the two members has a first width, the second extended portions are formed at edges positioned at a rear end of the arm hole so that each of rear ends of the two members has a second width, and the third extended portions are formed at both sides of a middle portion of the arm hole so that each of middle portions of the two members has a third width.

The foregoing and/or other aspects and advantages of the present general inventive concept may also be achieved by providing an actuator assembly usable in a hard disk drive to move a read/write head about a rotation axis, the actuator assembly including a member disposed in a longitudinal direction to be rotatable with respect to a rotation axis, and formed with an arm hole having substantially a triangular shape having a first edge and second edges, the arm hole having a first circular portion formed at the first edge thereof, the arm hole having second circular portions formed at corresponding ones of the second edges thereof, spaced apart from each other with respect to the longitudinal direction, and disposed closer to the rotation axis than the leading end, and the arm hole having a center hole disposed along the longitudinal direction to connect the first circular portion to the second circular portions.

The foregoing and/or other aspects and advantages of the present general inventive concept may also be achieved by providing an actuator assembly usable in a hard disk drive to move a read/write head about a rotation axis, the actuator assembly including two sub members disposed opposite to each other with respect to a longitudinal direction thereof, including leading and rear portions connected to each other in a circumferential direction of a rotation axis thereof, and including middle portions disposed between the leading and rear portions to define an arm hole with the leading and rear portions, the leading portion having a first plate to define a first circular portion of the arm hole, the rear portions having a second plate to define second circular portions of the arm hole, the middle portions having a middle plate to define third circular portions of the arm hole.

The foregoing and/or other aspects and advantages of the present general inventive concept may also be achieved by providing a hard disk drive to move a read/write head about a rotation axis, including an actuator arm having a member disposed in a longitudinal direction and having an arm hole formed in the member in the longitudinal direction thereof, the member having a leading portion to define a first portion of the arm hole and having a rear portion to define second portions of the arm hole, such that the member comprises a first link formed between a first portion of the leading portion and a second portion of the leading portion, a second link formed between the second portion of the leading portion and a third portion of the rear portion, a third link formed between the third portion of the rear portion and the first portion of the leading portion.

The hard disk drive may further include a read/write head connected to the first link and spaced apart from the first link such that a displacement of the read/write head in a major resonance mode is minimized when the first, second, third, and fourth links are deformed, or when the arm hole is deformed. The first link moves by a first distance with respect to a reference, and the read/write head moves by a second distance with respect to the reference.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
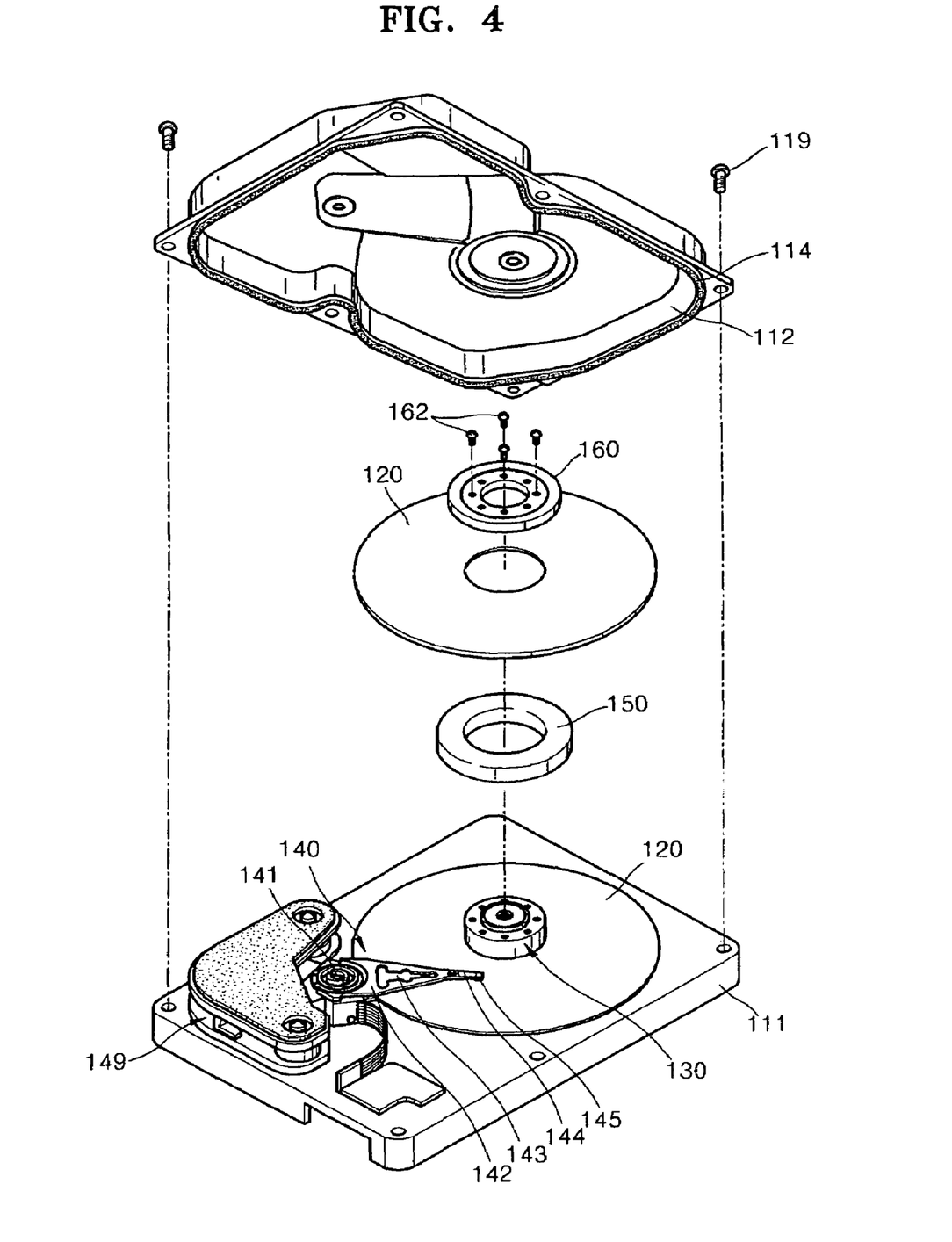
FIG. 4 is an exploded perspective view illustrating a hard disk drive having an actuator assembly according to an embodiment of the present general inventive concept.
Figure 5:
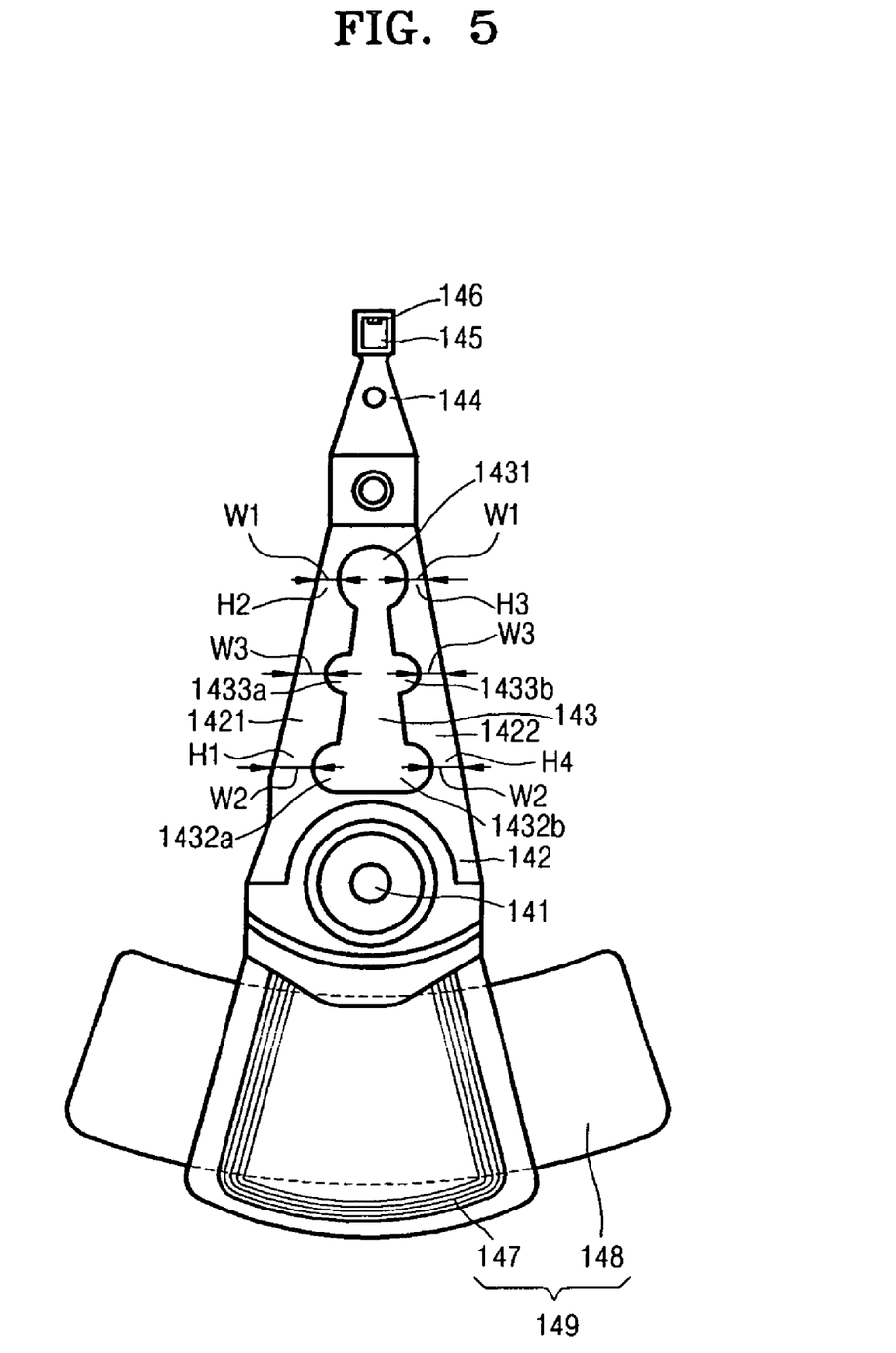
FIG. 5 is a plan view illustrating the actuator assembly of FIG. 4.

FIG. 4 is an exploded perspective view illustrating a hard disk drive having an actuator assembly according to an embodiment of the present general inventive concept, and FIG. 5 is a plan view illustrating the actuator assembly of FIG. 4.

Referring to FIGS. 4 and 5, the hard disk drive includes a base member 111, a cover member 112, a disk 120 of a data storage medium, a spindle motor 130 to rotate the disk 120, and an actuator assembly 140 to move a read/write head 146 to a position above the disk 120.

The spindle motor 130 and the actuator assembly 140 are installed on the base member 111. The cover member 112 is assembled on an upper portion of the base member 111 using a plurality of fastening screws 119 to surround and protect the disk 120, the spindle motor 130, and the actuator assembly 140. A gasket 114 is disposed between the base member 111 and the cover member 112 to seal an inside of the hard disk drive.

The disk 120 is coupled to the spindle motor 130. If two or more disks 120 are used, a disk spacer 150 is located therebetween to maintain a distance between the disks 120. A disk clamp 160 is coupled to an upper portion of the spindle motor 130 by clamp fastening screws 162 to securely fix the disk 120 to the spindle motor 130.

The actuator assembly 140 includes an actuator arm 142, a suspension 144, a slider 145 mounted with a read/write head 146, and a voice coil motor (VCM) 149. The actuator arm 142 is rotatably coupled to a pivot shaft 141 installed on the base member 111. The suspension 144 is fixed to the leading end of the actuator arm 142 to support the slider 145 biasing the head 146 against the surface of the disk 120. The VCM 149 provides a driving force to rotate the actuator arm 142 with respect to the pivot shaft 141, and includes a voice coil 147 connected to a rear end of the actuator arm 142, and a magnet 148 arranged opposite to the voice coil 147 with respect to the pivot shaft 141.

The voice coil motor 149 is controlled by a servo control system so that the actuator arm 142 is rotated according to Fleming's left-hand rule by an interaction between an input electric current of the voice coil 147 and a magnetic field of the magnet 148. When the hard disk drive is turned on and the disk 120 starts to rotate, the voice coil motor 149 moves the actuator arm 142 to move the read/write head 146 to a position above a data recording surface of the disk 120. The read/write head 146 traces a track on the data recording surface of the disk 120 to record or reproduce data. When the hard disk drive is turned off and the disk 120 stops rotating, the voice coil motor 149 moves the actuator arm 142 in an opposite direction to move the read/write head 146 away from the data recording surface of the disk 120.

In the actuator assembly 140 of the present embodiment, the actuator arm 142 has a four-bar linkage structure. To this end, an arm hole 143 is formed between a leading plate end of the actuator arm 142 and the pivot shaft 141. The arm hole 143 may have a substantially triangular shape. The arm hole 143 is reduced in its width as it goes to the leading plate end of the actuator arm 142 and away from the pivot shaft 141. The actuator assembly 140 may have circular extended portions 1431, 1432a, and 1432b formed at three edge portions of the arm hole 143. The circular extended portions 1431, 1432a, and 1432b may be a portion of a circular shape or a curved shape. When one end of the arm hole 143 facing the suspension 144 is referred to as a leading end thereof and the other end facing the pivot shaft 141 is referred to as a rear end thereof, a first circular extended portion 1431 is formed at the edge portion positioned at the leading end of the arm hole 143, and second circular extended portions 1432a and 1432b are formed at the edge portions positioned at the rear end of the arm hole 143.

The actuator assembly 140 includes two members 1421 and 1422 disposed in a longitudinal direction. The two members 1421 and 1422 have leading and rear portions connected to each other to form the leading and rear ends of the actuator arm 142, respectively, and the middle portions disposed between the leading and rear portions and/or spaced-apart from each other to define the arm hole 143 with the leading and rear portions. The two members 1421 and 1422 include a first surface to define the first circular extended portion 1431, and a second surface to define the second circular extended portions 1432a, and 1432b. Also, the two members 1421 and 1422 may include third surfaces to define third circular extended portions 1433a and 1433b, and may also include fourth surfaces to define linear portions of the arm hole 143 between the first and third circular extended portions 1431 and 1433a, between the third and second circular extended portions 1433a and 1432a, between the second and third circular extended portions 1432b and 1433b, and between the third and first circular extended portions 1433b and 1431. It is possible that the second surfaces of the two members 1421 and 1422 may be an additional surface (or additional linear surface) to connect the second circular extended portions 1432a and 1432b. The arm hole 143 may include a center hole disposed along the longitudinal direction to connect the first circular extended portion 1431 to the second circular extended portions 1432a and 1432b and to connect the third extended portions 1433a and 1433b.

The arm hole 143 with this shape gives the actuator arm 142 a four-bar linkage structure which will be described later in detail.

Figure 6:
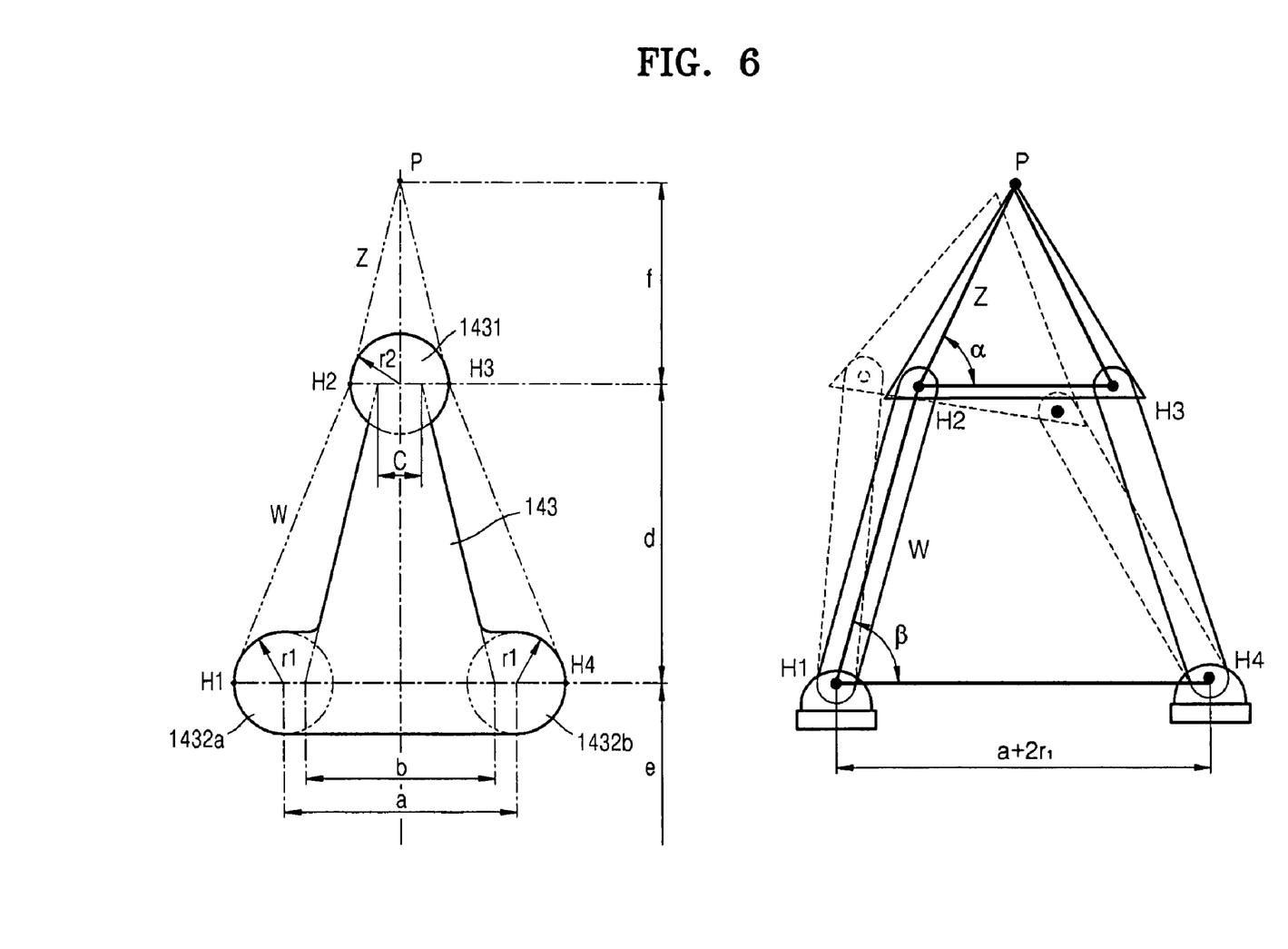
FIG. 6 is a view illustrating a four-bar linkage structure adapted to an actuator arm of an actuator assembly according to an embodiment of the present general inventive concept.

FIG. 6 is a view illustrating a four-bar linkage structure adapted to an actuator arm of an actuator assembly according to an embodiment of the present general inventive concept.

Referring first to a left side drawing of FIG. 6, the four-bar linkage structure includes four hinges H1, H2, H3 and H4 connected to define four links H1-H2, H2-H3, H3-H4 and H4-H1. The link H4-H1 serves as a substantial base link. In FIG. 6, "W" indicates a position vector generated by the links H1-H2 and H3-H4, and "Z" indicates a position vector of a point P as seen from the hinge H2. "α" is an angle of Z vector, and "β" is an angle of W vector.

The portion of the circular shape of the first circular extended portion 1431 may have a radius r2, and the portions of the circular shape of the second circular extended portions 1432a and 1432b may have a radius r1. The radius r2 of the first circular extended portion 1431 may be equal to the radius r2 of the second circular extended portions 1432a and 1432b. It is also possible that the radius r2 of the first circular extended portion 1431 may be greater or smaller than the radius r2 of the second circular extended portions 1432a and 1432b.

Reference character "a" denotes a distance between centers of the circular shapes of the second circular extended portions 1432a and 1432b, "b" denotes a distance between extensions of the linear portions which meet a line passing through the centers of the circular shapes of the second circular extended portions 1432a and 1432b or meet the additional linear surface of the two members 1421 and 1422, and "c" denotes a distance between extensions of the linear portions which meet a line passing through the center of the circular shape of the first circular extended portion 1431. The hinges H1 and H4 may be spaced apart from each other by a distance of a+2r1. It is also possible that the link H4-H1 has a length of a+2r1.

Reference character "f" denotes a length between the point P and the center of the first circular extended portion 1431, "d" denotes a length between the center of the first circular extended portion 1431 and the line passing through centers of the second circular extended portions 1432a and 1432b, and "e" denotes a length between the line passing through the centers of the second circular extended portions 1432a and 1432b and the pivot shaft 141. The length "d" is longer than the length e and f. The distance f is shorter than the length d and e.

In the four-bar linkage structure, when α and β are varied within a certain range, and lengths of the links are adjusted appropriately, as shown in a right side drawing of FIG. 6, a displacement δ of the point P is illustrated using a solid line and a dotted line and can be 0 or minimized. The point P may moves by the displacement δ with respect to the link H4-H1 or the four surfaces of the two members 1421 and 1422.

Referring again to FIG. 5, the actuator arm 142 is divided into the two members 1421 and 1422 separated by the arm hole 143. Both end portions of each of the two members 1421 and 1422 are reduced in their widths W1 and W2 by first and second extended portions 1431, and 1432a and 1432b of the arm hole 143, so that the both ends of each of the two members 1421 and 1422 function as the hinges H1, H2, H3 and H4 of the four-bar linkage structure. The read/write head 146 is positioned at the point P. Accordingly, the displacement of the read/write head 146 in a major resonance mode is minimized, reducing a position error signal (PES) when operating the hard disk drive and improving performance and reliability of reading and writing in the hard disk drive.

In the present embodiment, the arm hole 143 includes the third circular extended portions 1433a and 1433b at sides of their middle portions. The third extended portions 1433a and 1433b reduce the widths W3 of both middle portions of the two members 1421 and 1422 of the actuator arm 142. The third extended portions 1433a and 1433b are formed such that the widths W3 of the middle portions of the two members 1421 and 1422 of the actuator arm 142 are larger than the widths W1 of the leading end, but smaller than the widths W2 of the rear end.

In this construction, the leading end and rear end of the two members 1421 and 1422 of the actuator arm 142 function as hinges of the four-bar linkage structure due to first and second extended portions 1431, and 1432a, and 1432b. The widths W3 of the middle portions of the two members 1421 and 1422 of the actuator arm 142 are reduced due to the third extended portions 1433a and 1433b, which provides flexibility. Accordingly, as will be described, a gain margin and a frequency of the major resonance mode are increased.

Also, the inertial mass of the actuator arm 142 is decreased due to the third extended portions 1433a and 1433b, so that an inertia force applied when vibrations are applied to the actuator arm 142 is decreased.

Figure 7:
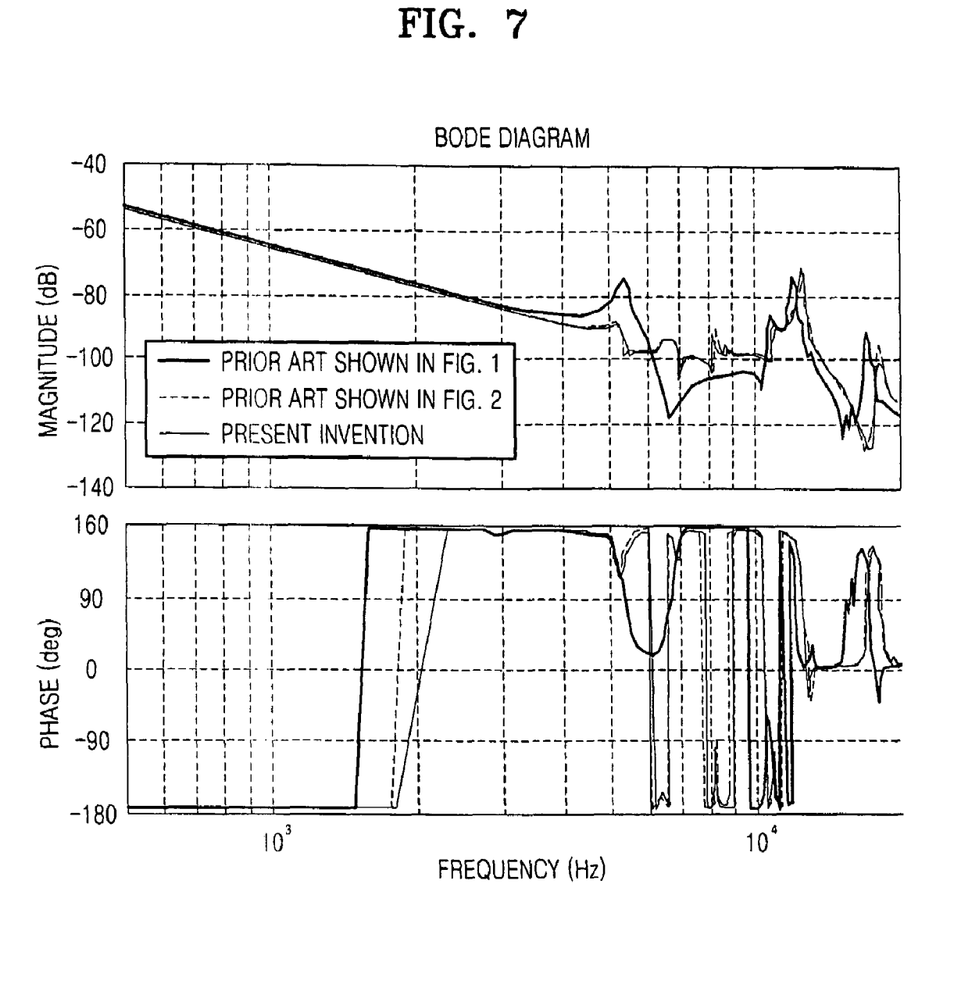
FIG. 7 is a view illustrating a Bode diagram graph of an actuator assembly according to an embodiment of the present general inventive concept compared to a conventional actuator assembly.

FIG. 7 is a view illustrating a Bode diagram graph of an actuator assembly according to an embodiment of the present general inventive concept compared to a conventional actuator assembly.

Table 1 illustrates dynamic characteristics of the actuator assembly of FIG. 5 and the conventional actuator assembly of FIGS. 1 and 2.

TABLE 1

| TYPE | GAIN MARGIN | INERTIA FORCE | FREQUENCY OF MAJOR RESONANCE MODE |
|---|---|---|---|
| PRIOR ART OF FIG. 1 | 20.7 dB | 29.76 g · cm³ | 5420 Hz |
| PRIOR ART OF FIG. 2 | 34.3 dB | 29.06 g · cm³ | 5190 Hz |
| PRESENT INVENTION OF FIG. 5 | 34.5 dB | 28.19 g · cm³ | 5243 Hz |

Referring FIG. 7 and Table 1, it can be seen that although the conventional actuator assembly of FIG. 2 with a bar linkage structure has an increased gain margin relative to the conventional actuator assembly of FIG. 1, it also has the drawback of decreased a frequency of the major resonance mode.

However, the actuator assembly of the present embodiment has an advantage in that the gain margin and the frequency of the major resonance mode are increased relative to the conventional actuator assembly of FIG. 2. The actuator assembly of the present embodiment also has the advantage mentioned above, such that when the inertial mass is decreased, the inertia force is decreased relative to that occurred in the conventional actuator arm of FIG. 2. These advantages widen a bandwidth for position control of the read/write head.

As described before, an actuator assembly of the present embodiment includes an actuator arm having an arm hole with a shape capable of improving dynamic characteristics, thereby minimizing the displacement of a read/write head in a major resonance mode.

Further, according to an actuator arm of the present embodiment, compared to the conventional bar linkage structure actuator arm, the gain margin and the frequency of the major resonance mode are increased, and an inertia force is decreased, thereby widening the bandwidth for position control of the read/write head.

Accordingly, a position error signal is decreased when a hard disk drive operates, to thus improve the performance and reliability of reading and writing.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An actuator arm of a hard disk drive to move a read/write head, comprising:
   an arm hole having first, second, and third extended portions; and
   two members positioned at both sides of the arm hole;
   wherein the first extended portion is formed at an edge positioned at a leading end of the arm hole so that each of leading ends of the two members has a first width, the second extended portions are formed at edges positioned at a rear end of the arm hole so that each of rear ends of the two members has a second width, and the third extended portions are formed at both sides of a middle portion of the arm hole so that each of middle portions of the two members has a third width, and
   wherein the third extended portions are wider than the first extended portion and the second extended portions are wider than the third extended portions.

2. The actuator arm according to claim 1, wherein the third extended portions are formed such that the third width is smaller than the second width and larger than the first width.

3. An actuator assembly usable in a hard disk drive, comprising:
   a slider to support a read/write head;
   a suspension to support the slider;
   an actuator arm rotatably coupled to a pivot shaft and coupled to a leading end of the suspension; and
   a voice coil motor to rotate the actuator arm with respect to the pivot shaft,
   wherein the actuator arm has an arm hole having first, second, and third extended portions and two members positioned at both sides of the arm hole,
   wherein the first extended portion is formed at an edge positioned at a leading end of the arm hole so that each of leading ends of the two members has a first width, wherein the second extended portions are formed at edges positioned at a rear end of the arm hole so that each of rear ends of the two members has a second width, and wherein the third extended portions are formed at both sides of a middle portion of the arm hole so that each of middle portions of the two members has a third width,
   wherein the third extended portions are wider than the first extended portion and the second extended portions are wider than the third extended portions.

4. The actuator assembly according to claim 3, wherein the third extended portions are formed such that the third width is smaller than the second width and larger than the first width.

5. An actuator assembly usable in a hard disk drive to move a read/write head about a rotation axis, the actuator assembly comprising:
   a member disposed in a longitudinal direction to be rotatable with respect to a rotation axis, and formed with an arm hole having substantially a triangular shape having a first edge and second edges, the arm hole having a first circular portion formed at the first edge thereof, the arm hole having second circular portions formed at corresponding ones of the second edges thereof, spaced apart from each other with respect to the longitudinal direction, and disposed closer to the rotation axis than a leading end of the member, and the arm hole having a center hole disposed along the longitudinal direction to connect the first circular portion to the second circular portions, wherein the arm hole comprises third circular portions formed on a first line connected between the first edge and one of the second edges and a second line connected between the first edge and the other one of the second edges, respectively, and the third circular portions are disposed opposite to each other with respect to the longitudinal direction.

6. The actuator assembly according to claim 5, wherein the third circular portions are disposed on a first middle of the first line and a second middle of the second line, respectively.

7. An actuator assembly usable in a hard disk drive to move a read/write head about a rotation axis, the actuator assembly comprising:

two sub members disposed opposite to each other with respect to a longitudinal direction thereof, including leading and rear portions connected to each other in a circumferential direction of a rotation axis thereof, and including middle portions disposed between the leading and rear portions to define an arm hole having substantially a triangular shape with an apex of the triangle located toward the leading portions of the sub members, the arm hole having a first edge and second edges, the leading portions of the sub members each having a first plate to define a first circular portion of the arm hole at the first edge of the arm hole, the rear portions each having a second plate to define second circular portions of the arm hole at the second edges of the arm hole, the middle portions having a middle plate to define third circular portions of the arm hole.

8. The actuator assembly according to claim 7, wherein the first plate has a first width, the second plate has a second width, and the middle plate has a third width wider than the first width and narrower than the second width.

* * * * *